(12) United States Patent
Li et al.

(10) Patent No.: US 11,912,298 B2
(45) Date of Patent: Feb. 27, 2024

(54) EVENT SCHEDULING SYSTEM FOR COLLECTING IMAGE DATA RELATED TO ONE OR MORE EVENTS BY AUTONOMOUS VEHICLES

(71) Applicant: GM Global Technology Operations LLC, Detroit, MI (US)

(72) Inventors: Chuan Li, Troy, MI (US); Donald K. Grimm, Utica, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 24 days.

(21) Appl. No.: 17/680,682

(22) Filed: Feb. 25, 2022

(65) Prior Publication Data
US 2023/0271629 A1   Aug. 31, 2023

(51) Int. Cl.
| | |
|---|---|
| B60W 60/00 | (2020.01) |
| G01C 21/34 | (2006.01) |
| G01C 21/36 | (2006.01) |
| H04W 4/46 | (2018.01) |

(52) U.S. Cl.
CPC ....... B60W 60/001 (2020.02); G01C 21/3492 (2013.01); G01C 21/3691 (2013.01); H04W 4/46 (2018.02); B60W 2420/42 (2013.01); B60W 2554/4049 (2020.02)

(58) Field of Classification Search
CPC ........... B60W 60/001; B60W 2420/42; B60W 2554/4049; G01C 21/3492; G01C 21/3691; H04W 4/46
See application file for complete search history.

(56) References Cited

U.S. PATENT DOCUMENTS

| | | | | |
|---|---|---|---|---|
| 2014/0136098 | A1* | 5/2014 | Stroila | H04N 7/185 |
| | | | | 701/408 |
| 2018/0288502 | A1* | 10/2018 | Higuchi | H04Q 9/00 |
| 2019/0354771 | A1* | 11/2019 | Kleinrock | G06F 16/909 |
| 2020/0090504 | A1* | 3/2020 | Kadar | G08G 1/0141 |
| 2020/0149897 | A1* | 5/2020 | Xiong | G05D 1/0274 |

(Continued)

FOREIGN PATENT DOCUMENTS

| | | | | |
|---|---|---|---|---|
| CN | 108877208 | A  * | 11/2018 | ............... G08G 1/01 |
| JP | 2018055581 | A  * | 4/2018 | |
| WO | WO-2019159429 | A1 * | 8/2019 | |

OTHER PUBLICATIONS

Machine Translation of CN108877208A (Year: 2018).*
Machine Translation of JP2018055581A (Year: 2018).*
Machine Translation of WO2019159429A1 (Year: 2019).*

*Primary Examiner* — Faris S Almatrahi
*Assistant Examiner* — Sahar Motazedi
(74) *Attorney, Agent, or Firm* — Vivacqua Crane, PLLC

(57) ABSTRACT

An event scheduling system for collecting image data related to one or more events by one or more autonomous vehicles includes a centralized scheduling system in wireless communication with one or more autonomous vehicles. Each autonomous vehicle collects the image data related to the one or more events while following a unique travel schedule. The centralized scheduling system executes instructions to determine the unique travel schedule for a specific autonomous vehicle, where the unique travel schedule directs the specific autonomous vehicle to the specific location of the filtered event to collect the image data.

20 Claims, 4 Drawing Sheets

(56) References Cited

U.S. PATENT DOCUMENTS

| | | | | |
|---|---|---|---|---|
| 2020/0312046 A1* | 10/2020 | Righi | ................... | G07C 5/008 |
| 2020/0336541 A1* | 10/2020 | Naderi Alizadeh | ..... | H04L 67/01 |
| 2020/0359181 A1* | 11/2020 | Kusumoto | ............. | H04W 4/44 |
| 2022/0108291 A1* | 4/2022 | Cain, Jr. | ............... | G06Q 20/389 |
| 2023/0125597 A1* | 4/2023 | Ishikawa | ............. | G08G 1/0112 |
| | | | | 701/117 |

* cited by examiner

EVENT SCHEDULING SYSTEM FOR COLLECTING IMAGE DATA RELATED TO ONE OR MORE EVENTS BY AUTONOMOUS VEHICLES

INTRODUCTION

The present disclosure relates to an event scheduling system for collecting image data related to one or more events by one or more autonomous vehicles, where the event scheduling system determines a unique travel schedule for a specific autonomous vehicle. The autonomous vehicles collect the image data related to the one or more events while following their unique travel schedules. The unique travel schedule is determined based on either a dynamic programming scheduling approach or a greedy algorithm approach.

Autonomous vehicles may employ a variety of technologies that collect sensory information to detect their surroundings such as, but not limited to, radar, laser light, global positioning systems (GPS), and cameras. In particular, autonomous vehicles employ multiple cameras to extract three-dimensional data regarding objects in their surrounding environment. However, the cameras may sometimes encounter issues that make it impossible to view some of the autonomous vehicle's surroundings. For example, one issue that may occur is vision occlusion, which occurs when features of an object are being masked by other bodies. In another example, the autonomous vehicle's cameras may not be functional and are therefore unable to collect image data regarding the surrounding objects. This issue may be further compounded when there is an event such as a traffic incident that occurs in the surrounding environment, and the camera is unable to view the traffic incident.

Thus, while current vehicles achieve their intended purpose, there is a need in the art for an improved approach for collecting image data by autonomous vehicles.

SUMMARY

According to several aspects, an event scheduling system for collecting image data related to one or more events by one or more autonomous vehicles is disclosed. The event scheduling system includes a centralized scheduling system in wireless communication with the one or more autonomous vehicles, where each autonomous vehicle collects the image data related to the one or more events while following a unique travel schedule. The centralized scheduling system executes instructions to receive one or more notifications indicating an event has occurred and create an event pool that stores the one or more events. The centralized scheduling system executes instructions to compare a predetermined route corresponding to a specific autonomous vehicle with a specific location corresponding to each event stored the event pool to identify one or more filtered events. The centralized scheduling system executes instructions to determine the specific autonomous vehicle is present when a filtered event occurs based on the predetermined route and the specific location of the filtered event. The centralized scheduling system executes instructions to identify a matched pair that includes the filtered event and the predetermined route for the specific autonomous vehicle. Finally, the centralized scheduling system executes instructions to determine the unique travel schedule for the specific autonomous vehicle based on the matched pair, where the unique travel schedule directs the specific autonomous vehicle to the specific location of the filtered event to collect the image data.

In an aspect, the one or more events include a traffic incident involving one or more vehicles.

In another aspect, the one or more events indicate the presence of an object.

In still another aspect, the object is one of the following: a pothole on a roadway, a traffic sign, a street sign, a road marking, a building, a landmark, a bicyclist, and a pedestrian.

In an aspect, the one or more notifications are generated by another autonomous vehicle or by an individual.

In another aspect, the unique travel schedule is determined based on either a dynamic programming scheduling approach or a greedy algorithm approach.

In still another aspect, the specific autonomous vehicle includes an event observing capacity indicating a number of events the specific autonomous vehicle observes and collects image data for simultaneously.

In an aspect, the centralized scheduling system executes instructions to execute a dynamic programming scheduling algorithm for a predetermined number of rounds to determine the unique travel schedule, where the predetermined number of rounds is equal to the event observing capacity of the specific autonomous vehicle.

In another aspect, the centralized scheduling system executes instructions to execute a greedy algorithm that introduces the events sequentially to the unique travel schedule of the specific autonomous vehicle until the event observing capacity of the specific autonomous vehicle is reached.

In still another aspect, the centralized scheduling system executes instructions to execute a greedy algorithm that introduces the events based on a total number of events occurring at each event location until the event observing capacity of the specific autonomous vehicle is reached.

In an aspect, the centralized scheduling system executes instructions to execute a greedy algorithm that introduces the events based on a minimum number of observers required by each event in the event pool until the event observing capacity of the specific autonomous vehicle is reached.

In another aspect, the minimum number of observers represent a minimum number of vehicles required to collect the image data for the specific event.

In still another aspect, the centralized scheduling system executes instructions to determine a maximum capacity percentage for each of the one or more autonomous vehicles based on a machine learning algorithm, wherein the maximum capacity percentage indicates availability for executing an unexpected task that is not included as part of the unique travel schedule.

In an aspect, the centralized scheduling system executes instructions to calculate a cost function of the machine learning algorithm and solve for an output value that is part of the cost function, where the output value indicates the maximum capacity percentage for the specific autonomous vehicle.

In an aspect, a method for determining a unique travel schedule for a specific autonomous vehicle. The method includes receiving, by a centralized scheduling system, one or more notifications indicating an event has occurred, where the centralized scheduling system is in wireless communication with the one or more autonomous vehicles and each autonomous vehicle collects the image data related to the one or more events. The method includes creating, by the centralized scheduling system, an event pool that stores the one or more events. The method further includes comparing a predetermined route corresponding to a specific autonomous vehicle with a specific location corresponding to each event stored the event pool to identify one or more filtered events, where the specific autonomous vehicle travels to the specific location corresponding to the filtered event when following the predetermined route. The method includes determining the specific autonomous vehicle is present when a filtered event occurs based on the predetermined route and the specific location of the filtered event. The method also includes identifying a matched pair that includes the filtered event and the predetermined route for the specific autonomous vehicle. The method also includes determining the unique travel schedule for the specific autonomous vehicle based on the matched pair, where the unique travel schedule directs the specific autonomous vehicle to the specific location of the filtered event to collect the image data related to the filtered event. The method also includes executing a dynamic programming scheduling algorithm for a predetermined number of rounds to determine the unique travel schedule, where the predetermined number of rounds is equal to the event observing capacity of the specific autonomous vehicle.

In an aspect, the method includes executing a greedy algorithm that introduces the events sequentially to the unique travel schedule of the specific autonomous vehicle until the event observing capacity of the specific autonomous vehicle is reached.

In another aspect, the method includes executing a greedy algorithm that introduces the events based on a total number of events occurring at each event location until the event observing capacity of the specific autonomous vehicle is reached.

In still another aspect, the method includes executing a greedy algorithm that introduces the events based on a minimum number of observers required by each event in the event pool until the event observing capacity of the specific autonomous vehicle is reached.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
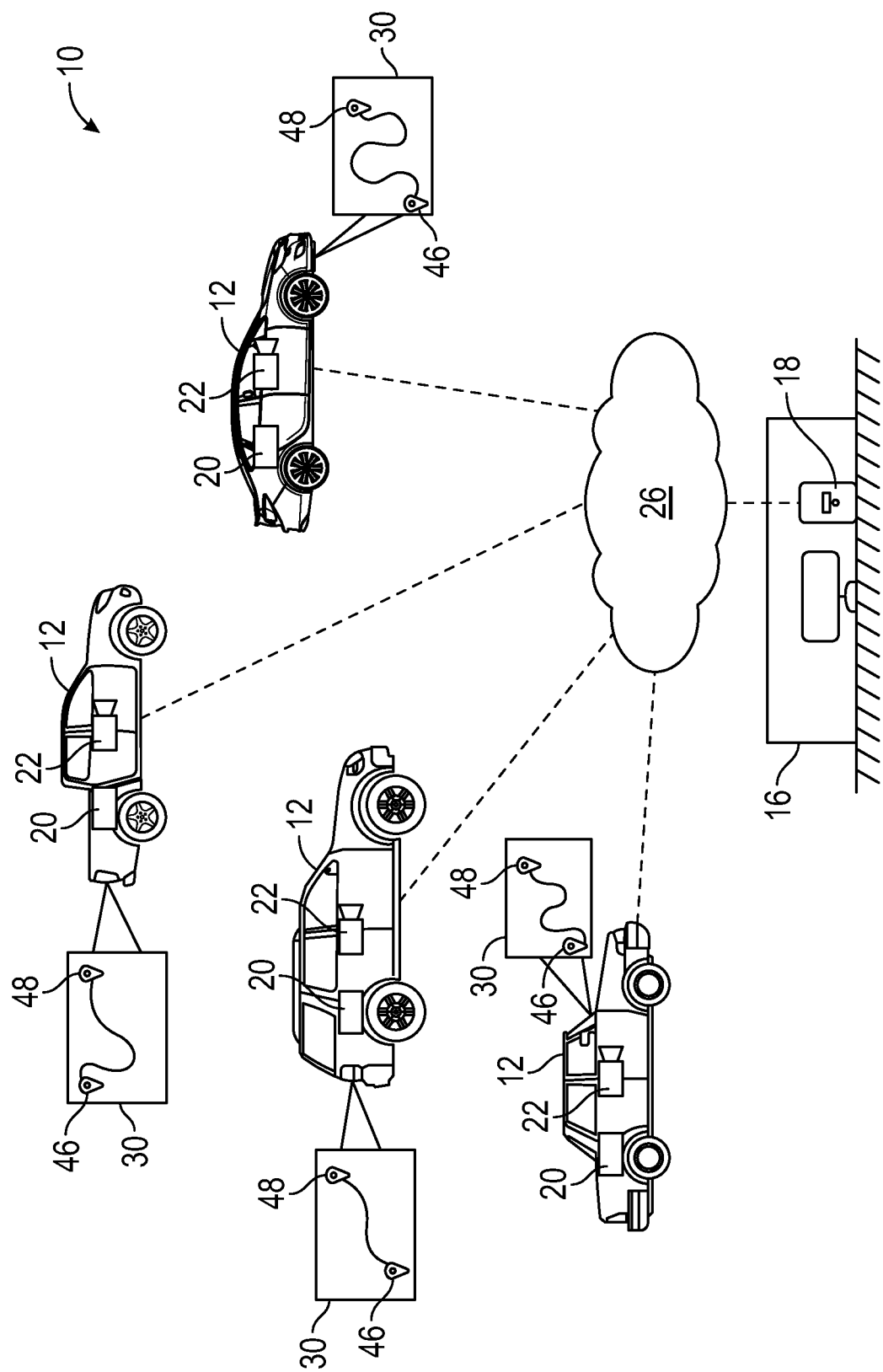
FIG. 1 is a schematic diagram of the disclosed event scheduling system including a centralized scheduling system in wireless communication with one or more autonomous vehicles, according to an exemplary embodiment.

Referring to FIG. 1, an exemplary event scheduling system 10 for collecting image data related to one or more events is illustrated. The event scheduling system 10 includes one or more autonomous vehicles 12 and a back-end office 16, where the one or more autonomous vehicles 12 are in wireless communication with one or more centralized scheduling systems 18 that are part of the back-end office 16 by a network 26. The autonomous vehicles 12 each include one or more automated driving controllers 20 that execute routing algorithms for determining a predetermined route 30 for a corresponding one of the autonomous vehicles 12, where the autonomous vehicles 12 follow the corresponding route 30. Each autonomous vehicle 12 shares their corresponding predetermined route 30 with the one or more centralized scheduling systems 18 of the back-end office 16. It is to be appreciated that the autonomous vehicle 12 may be any type of vehicle such as, but not limited to, a sedan, truck, sport utility vehicle, van, or motor home.

As explained below, the event scheduling system 10 determines a unique travel schedule 28 for each autonomous vehicle 12 (seen in FIG. 2). The autonomous vehicles 12 each include at least a camera 22 in electronic communication with the automated driving controller 20, where the camera 22 collects the image data related to the one or more events while following the unique travel schedule 28. The image data collected by the autonomous vehicles 12 is shared with the one or more centralized scheduling systems 18 of the back-end office 16. The event scheduling system 10 may collect image data related to a specific event from multiple perspectives (i.e., image data collected by different vehicle cameras that have different perspectives). In embodiments, if a camera 22 of an autonomous vehicle 12 is unable to collect data (for example, if the camera 22 is nonfunctional or if vision occlusion occurs), then the event scheduling system 10 may compensate for this issue by using image data collected by another autonomous vehicle 12 instead.

The event is any incident or object that is captured by image data. For example, the event may be a traffic incident involving one or more vehicles. Alternatively, in another example, the event indicates the presence of an object. Some examples of objects include, but are not limited to, a pothole on a roadway, a traffic sign, a street sign, a road marking, a building, a landmark such as a monument or statue, or an individual such as a bicyclist or a pedestrian. It is to be appreciated the event stays valid for a duration of time and does not occur instantaneously. Instead, the duration of time of the event is of sufficient length so that the event scheduling system 10 may dispatch one or more autonomous vehicles 12 to a corresponding location of the event to collect image data related to the event. For example, if the event is a traffic incident between two vehicles, then the duration of time for the traffic incident is of sufficient length so that one or more autonomous vehicles 12 may be dispatched to the corresponding location to collect image data.

It is to be appreciated that each individual event includes a required or minimum number of observers, where the minimum number of observers represent a minimum number of vehicles required to collect image data for the specific event. The minimum number of observers is based on the nature and type of event, where certain types of events may require more observers than other events. For example, an event such as a traffic incident involving more than two vehicles would require more observers when compared to viewing pothole or a street sign. Thus, in embodiments, the disclosed event scheduling system 10 collects image data related to a specific event from multiple perspectives (i.e., image data collected by different vehicles). It is also to be appreciated that each individual event occurs at a specific location. For example, if the individual event is a traffic incident, then the specific location indicates where on the roadway the traffic incident occurred.

Figure 2:
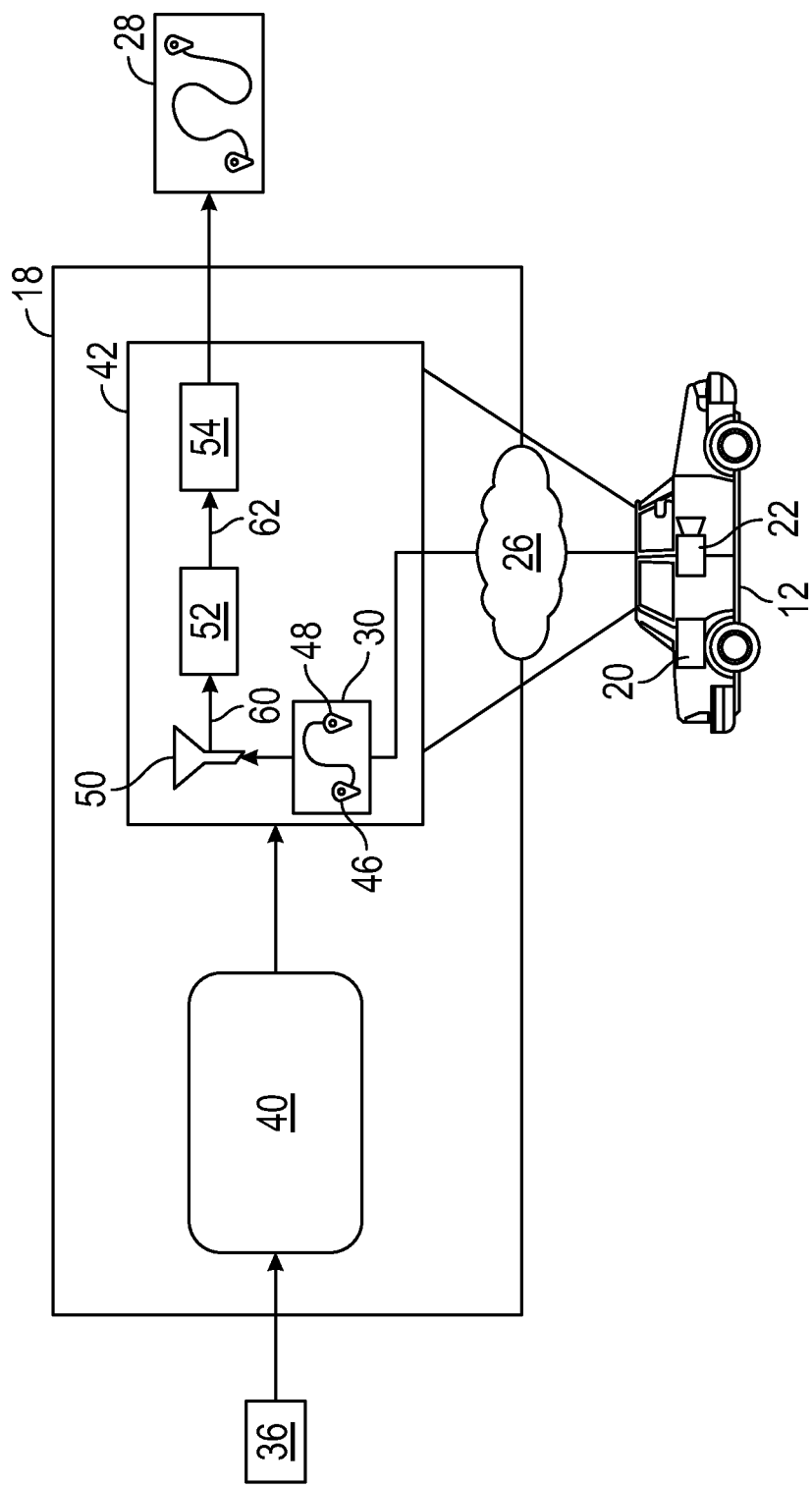
FIG. 2 is an operational flow diagram of the centralized scheduling system shown in FIG. 1 including an event pool and an individual travel schedule block for determining a unique travel schedule for a specific autonomous vehicle, 'according to an exemplary embodiment.

FIG. 2 is a flow diagram of the centralized scheduling system 18 shown in FIG. 1 for determining the unique travel schedule 28 for a specific autonomous vehicle 12. The centralized scheduling system 18 receives one or more notifications 36 indicating an event has occurred. It is to be appreciated that the notifications 36 are generated by another autonomous vehicle 12 connected to the network 26 or, in the alternative, by an individual. For example, an autonomous vehicle 12 may send a notification over the network 26 indicating involvement in a traffic incident. Alternatively, an individual such as a cloud operator or the driver of a vehicle may send a notification 36 indicating the event is occurring.

The centralized scheduling system 18 creates an event pool 40 and an individual travel schedule block 42. The event pool 40 stores the events and the individual travel schedule block 42 determines the unique travel schedule 28 for the specific autonomous vehicle 12. The individual travel schedule block 42 includes a filter 50, a matching block 52, and a route determination block 54 that determines the unique travel schedule 28. Referring to both FIGS. 1 and 2, the one or more automated driving controllers 20 for each autonomous vehicle 12 determines the predetermined route 30 based on an origin location 46, a destination location 48, and any stops in between the origin and destination locations. As seen in FIG. 2, the predetermined route 30 determined by a specific autonomous vehicle 12 is transmitted over the network 26 to the filter 50 of the individual travel schedule block 42 of the one or more centralized scheduling systems 18.

The filter 50 of the one or more centralized scheduling systems 18 compares the predetermined route 30 for a specific autonomous vehicle 12 with the specific location corresponding to each event stored the event pool 40 and determines if the specific autonomous vehicle 12 travels to any of the specific locations of the events stored in the event pool 40. The filter 50 then identifies one or more filtered events 60, where the specific autonomous vehicle 12 travels to the specific location corresponding to the filtered event 60.

The matching block 52 receives the one or more filtered events 60 and determines the specific autonomous vehicle is present when a filtered event occurs based on the predetermined route 30 corresponding to the specific autonomous vehicle 10 and the specific location of the filtered event. In an embodiment, the centralized scheduling system 18 compares a first interval of time when the specific autonomous vehicle 12 is present at the specific location of the filtered event 60 while following the predetermined route 30 with a second interval of time when the filtered event 60 takes place, where the centralized scheduling system 18 determines the specific autonomous vehicle 12 is present when the filtered event occurs if the first interval of time overlaps with the second interval of time.

In response to determining the specific autonomous vehicle 12 is present at the specific location as the specific event takes place, the matching block 52 identifies a matched pair 62. The matched pair 62 includes the filtered event 60 and the predetermined route 30 for the specific autonomous vehicle 12. The individual travel schedule block 42 identifies matched pairs for each filtered event 60 identified by the filter 50. The route determination block 54 then determines the unique travel schedule 28 based on the matched pairs 62. In other words, the unique travel schedule 28 includes each filtered event 60 that is part of the event pool 40 that occurs at the same time the specific autonomous vehicle 12 is present to collect image data. Specifically, the specific autonomous vehicle 12 is present and collects the image data at the specific location of each filtered event 60 while following the unique travel schedule 28. It is to be appreciated that the unique travel schedule 28 may be determined based on either a dynamic programming scheduling approach or a greedy algorithm approach and is described in greater detail below.

Figure 3:
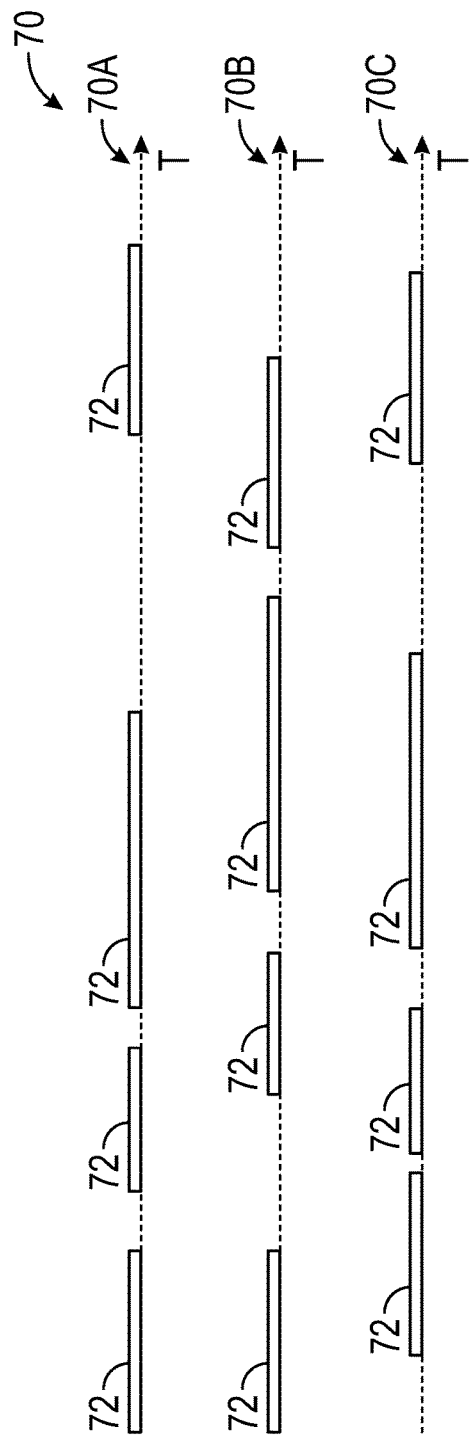
FIG. 3 is a time sequence diagram illustrating the dynamic programming scheduling approach for determining the unique travel schedule, according to an exemplary embodiment.

FIG. 3 is a time sequence diagram illustrating the dynamic programming scheduling approach, and illustrates three event sequences 70, where each event sequence 70 include four events 72. The time sequence diagram includes an x-axis, where time T is represented along the x-axis. As seen in FIG. 3, the events 72 are disjointed, and therefore do not overlap in their respective duration of time. Referring to both FIGS. 2 and 3, it is to be appreciated that the duration of time includes not only the time it takes to record the event 72 in real-time, but also processing and upload time. Specifically, the duration of time include capturing video or images in real-time by the camera 22 of the autonomous vehicle 12, saving the image data in memory or hard drive of the automated driving controllers 20, and uploading the image data over the network 26 to the one or more centralized scheduling systems 18.

Continuing to refer to FIGS. 2 and 3, it is to be appreciated that each autonomous vehicle 12 includes an event observing capacity, where the event observing capacity indicates a number of events the specific autonomous vehicle 12 observes and collects data for simultaneously. In the example as shown in FIG. 3, the event observing capacity is three, and therefore three event sequences 70 are shown. It is to be appreciated that FIG. 3 is merely exemplary in nature and the event observing capacity varies by vehicle and depends upon available storage in memory of the one or more automated driving controllers 20 and network speed of the network 26.

When employing the dynamic programming scheduling approach, the individual travel schedule block 42 of the centralized scheduling system 18 determines the unique travel schedule 28 for the specific autonomous vehicle 12 by selecting as many events 72 from each event sequence 70 for observation simultaneously as possible without exceeding the event observing capacity for the specific autonomous vehicle 12. The individual travel schedule block 42 of the centralized scheduling system 18 determines the unique travel schedule 28 by executing a dynamic programming scheduling algorithm for a predetermined number of rounds, where the predetermined number of rounds is equal to the event observing capacity. For example, if the specific autonomous vehicle 12 is capable of observing three events simultaneously, then the dynamic programming scheduling algorithm is executed three times. Each time the dynamic programming scheduling algorithm is executed, the dynamic programming scheduling algorithm determines one of the three event sequences 70.

For example, the first time the dynamic programming scheduling algorithm is executed, the first event sequence 70A is generated by selecting disjointed events 72 that do not overlap in their respective duration of time. It is to be appreciated that the dynamic programming scheduling algorithm selects as many events 72 for an event sequence as possible without creating any overlap in time between each event 72. During each event 72, the respective camera 22 of the specific autonomous vehicle 12 is present and collects the image data at the specific location before the respective event 72 expires. An event 72 expires once an occurrence that defined the event is no longer valid. For example, if the event 72 is a traffic incident, then the event 72 expires once the traffic incident has cleared and the vehicle involved have driven away. Once the specific autonomous vehicle 12 has finished observing the event, the specific autonomous vehicle 12 may drive to the specific location associated with the next event 72 that is part of the first event sequence 70A. Similarly, the second time the dynamic programming scheduling algorithm is executed the second event sequence 70B is generated, and the third time the dynamic programming scheduling algorithm the third event sequence 70C is generated. Once the dynamic programming scheduling algorithm is executed the predetermined number of rounds, the individual travel schedule block 42 of the centralized scheduling system 18 determines the unique travel schedule 28 for the specific autonomous vehicle 12 by merging the events 72 together. In the example as shown in FIG. 3, merging the events 72 includes merging all of the events 72 in the first event sequence 70A, the second event sequence 70B, and the third event sequence 70C together.

Figure 4:
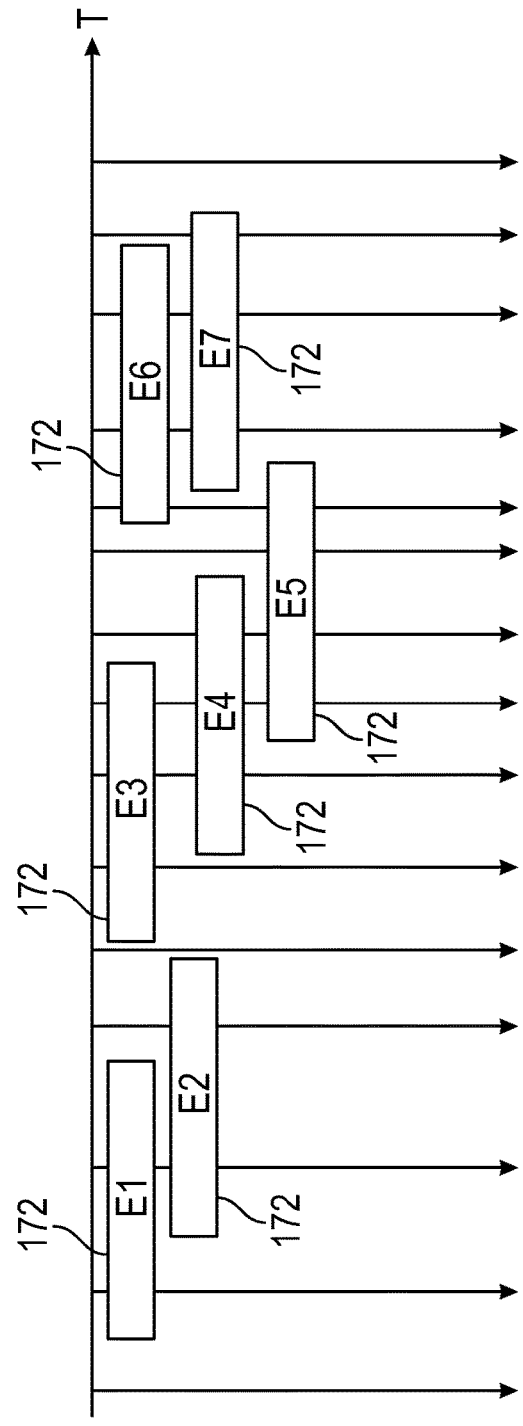
FIG. 4 is a time sequence diagram illustrating the greedy algorithm approach for determining the unique travel schedule, according to an exemplary embodiment.

FIG. 4 is a time sequence diagram illustrating the greedy algorithm approach for determining the unique travel schedule 28 according to an exemplary embodiment. In the example as shown, the x-axis represents the time T. In the non-limiting embodiment as shown in FIG. 4, the time sequence diagram illustrates seven events 172, which are numbered E1-E7. Referring to both FIGS. 2 and 4, in one embodiment, the individual travel schedule block 42 of the centralized scheduling system 18 determines the unique travel schedule 28 for the specific autonomous vehicle 12 by executing the greedy algorithm and introducing events sequentially to the unique travel schedule 28 until the event observing capacity for the specific autonomous vehicle 12 is met. Once the event observing capacity for the specific autonomous vehicle 12 is met, the greedy algorithm ignores additional events and will not introduce an additional event to the unique travel schedule 28 until one of the selected events has finished. In the example as shown in FIG. 4, the event observing capacity is two. Therefore, in the example as shown, if both events E3 and E4 are selected as part of the unique travel schedule 28, then the fifth event E5 may not be introduced to the unique travel schedule 28 until the third event E3 finishes.

In one embodiment, the individual travel schedule block 42 of the centralized scheduling system 18 determines the unique travel schedule 28 for the specific autonomous vehicle 12 by executing the greedy algorithm and introducing the events to the unique travel schedule 28 based on a total number of events occurring at the specific location of each event of the event pool 40 until the event observing capacity of the specific autonomous vehicle 12 is reached. Specifically, the greedy algorithm compares the total number of events of occurring at the specific location of each event stored in the event pool 40 and selects the events corresponding to the specific location having the greatest number of events to add to the unique travel schedule 28 of the specific autonomous vehicle 12. For example, if a first location A includes four events (e.g., events E1, E3, E5, E6) while a second location B includes three events (e.g., events E2, E4, E7), then the greedy algorithm selects the fifth event E5 instead of the fourth event E4, since the fifth event E5 is at the first location A where more events are located. Now that the first location A and the second location B have an equal number of events, the greedy algorithm may arbitrarily select the next event.

In one embodiment, the individual travel schedule block 42 of the centralized scheduling system 18 determines the unique travel schedule 28 for the specific autonomous vehicle 12 by executing the greedy algorithm and introducing the events in the event pool 40 to the unique travel schedule 28 based on the minimum number of observers required by each event in the event pool 40 until the event observing capacity of the specific autonomous vehicle is reached. That is, the greedy algorithm selects the event requiring the greatest number of observers. For example, if the minimum number of observers required by the fourth event E4 is nine, and the minimum number of observers for the fifth event E5 is ten, then the greedy algorithm selects the fifth event E5 since the fifth event E5 included the greatest number of observers. Now that the fourth event E4 and the fifth event E5 have an equal number of events, the greedy algorithm may arbitrarily select the next event.

Referring to FIG. 2, in an embodiment the centralized scheduling system 18 determines a maximum capacity percentage for each of the autonomous vehicles 12 based on a machine learning algorithm, where the maximum capacity percentage indicates availability for executing an unexpected task that is not included as part of the unique travel schedule 28. Specifically, the centralized scheduling system 18 determines the maximum capacity percentage for the specific autonomous vehicle 12 by calculating a cost function $J(\theta)$ of the machine learning algorithm and solving for an output value y that indicates the maximum capacity percentage for the specific autonomous vehicle 12. In an embodiment, the cost function is determined by combining a standard linear regression formula with a regularization function and is expressed by the following equation:

$$J(\theta) = \frac{1}{2m}\left[\sum_{i=1}^{m}\left(h_\theta(x^{(i)}) - y^{(i)}\right)^2 + \lambda \sum_{j=1}^{n} \theta_j^2\right]$$

where $h_\theta$ is a hypothesis, m denotes a number of data records used for the machine learning algorithm, $\lambda$ indicates an amount the machine learning algorithm should regularize, x is a features vector, and y is the output value. The features vector is expressed as $x=[x_1, x_2, x_3, x_4, x_5, x_6, x_7]$, where $x_1$ denotes road type such as freeways, local roads and residential roads, $x_2$ denotes road structure such as ramps, intersections, and roundabouts, $x_3$ denotes road speed limit, $x_4$ denotes a number of events occurring at a specific location, $x_5$ denotes geohash code, $x_6$ denotes vehicle capacity use percentage, and $x_7$ denotes how many unplanned event that a specific autonomous vehicle 12 is required to perform in the specific location.

Figure 5:
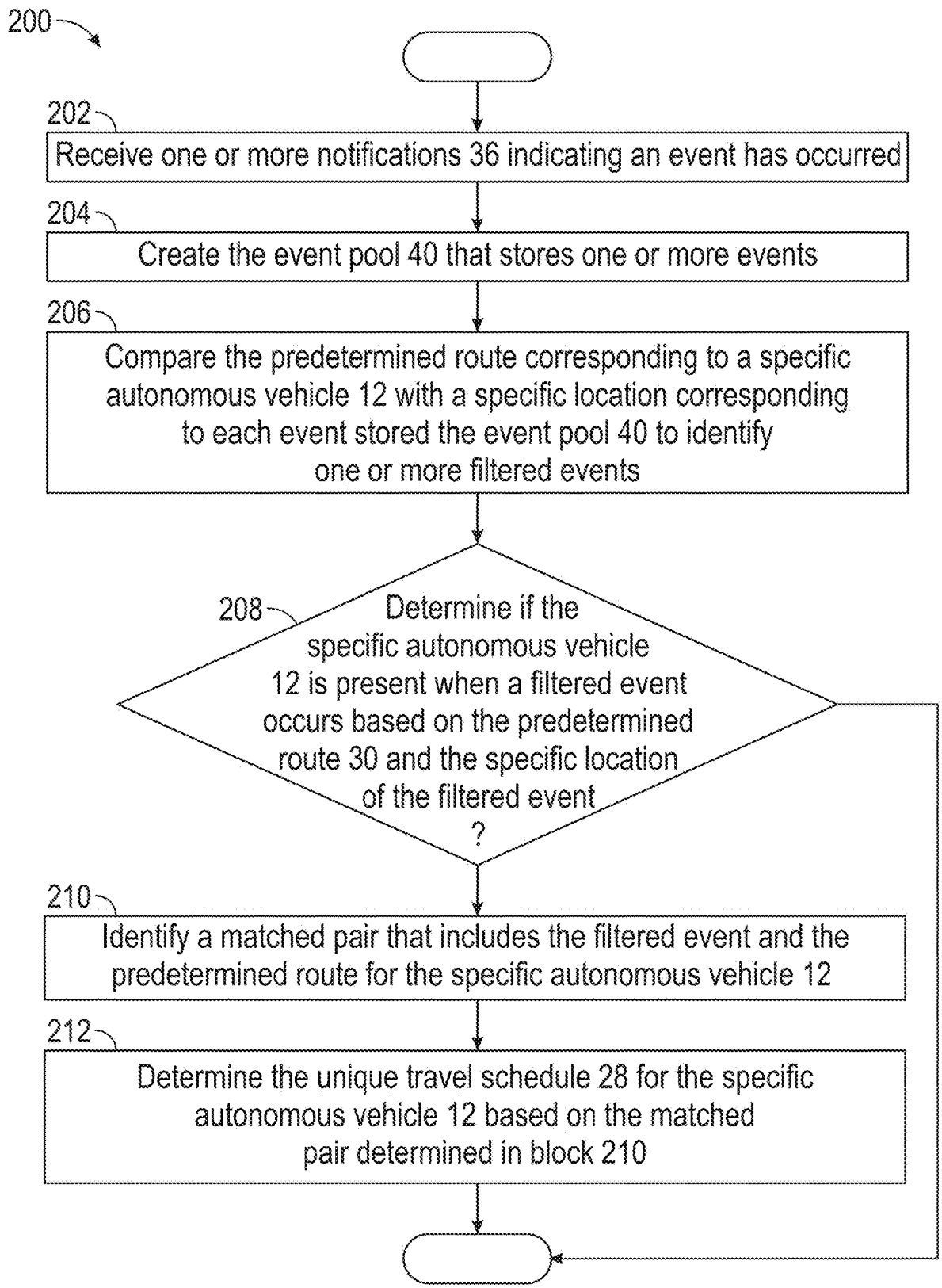
FIG. 5 is a process flow diagram illustrating a method for determining the unique travel schedule for a specific autonomous vehicle by the disclosed event scheduling system, according to an exemplary embodiment.

FIG. 5 is a process flow diagram illustrating a method 200 for determining the unique travel schedule 28 for a specific autonomous vehicle 12. Referring generally to FIGS. 1, 2, and 5, the method 200 may begin at block 202. In block 202, the centralized scheduling system 18 receive one or more notifications 36 indicating an event has occurred. As mentioned above, the notifications 36 are generated by another autonomous vehicle 12 connected to the network 26 or, in the alternative, by an individual. The method 200 may then proceed to block 204.

In block 204, the centralized scheduling system 18 creates the event pool 40 that stores one or more events. The method 200 may then proceed to block 206.

In block 206, the centralized scheduling system 18 compares the predetermined route corresponding to a specific autonomous vehicle 12 with a specific location corresponding to each event stored the event pool 40 to identify one or more filtered events, where the specific autonomous vehicle 12 travels to the specific location corresponding to the filtered event when following the predetermined route 30. The method 200 may then proceed to block 208.

In block 208, the centralized scheduling system 18 determines if the specific autonomous vehicle 12 is present when a filtered event occurs based on the predetermined route 30 and the specific location of the filtered event. Specifically, in an embodiment, the one or more centralized scheduling systems 18 compare a first interval of time at which the specific autonomous vehicle is present at the specific location of the filtered event while following the predetermined route overlaps with a second interval of time at which the filtered event takes place to determine if the first interval of time overlaps with the second interval of time, which indicates the specific autonomous vehicle 12 is present when the filtered event occurs. If the first interval of time does not overlap with the second interval of time, then the method 200 may terminate. Otherwise, the method 200 may then proceed to block 210.

In block 210, the centralized scheduling system 18 identifies a matched pair that includes the filtered event and the predetermined route for the specific autonomous vehicle 12. The method 200 may then proceed to block 212.

In block 212, the centralized scheduling system 18 determines the unique travel schedule 28 for the specific autonomous vehicle 12 based on the matched pair determined in block 210. The method 200 may then terminate.

Referring generally to the figures, the disclosed event scheduling system provides various technical effects and benefits by collecting image data pertaining to one or more events. The image data may be collected using multiple perspectives, since different vehicle cameras that have different perspectives). Thus, if one or more cameras of an autonomous vehicle are unable to collect data at a specific location, then the image data collected by the event scheduling system may be used instead. Accordingly, the disclosed system provides a cost-effective and relatively simple approach to collect image data based on task scheduling between autonomous vehicles.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An event scheduling system for collecting image data related to one or more events by one or more autonomous vehicles, wherein the event scheduling system comprises:
    a centralized scheduling system in wireless communication with the one or more autonomous vehicles, wherein each autonomous vehicle collects the image data related to the one or more events while following a unique travel schedule by a corresponding camera, and wherein the centralized scheduling system includes one or more processors that execute instructions to:
        receive one or more notifications indicating an event that is part of the one or more events has occurred;
        create an event pool that stores the one or more events;
        compare a predetermined route corresponding to a specific autonomous vehicle of the one or more autonomous vehicles with a specific location corresponding to each event stored in the event pool to identify one or more filtered events;
        determine the specific autonomous vehicle is present when a filtered event occurs based on the predetermined route and the specific location of the filtered event;
        identify a matched pair that includes the filtered event and the predetermined route for the specific autonomous vehicle; and
        determine the unique travel schedule for the specific autonomous vehicle based on the matched pair, wherein the unique travel schedule directs the specific autonomous vehicle to the specific location of the filtered event to collect the image data, and wherein the specific autonomous vehicle follows the unique travel schedule by autonomously traveling to the specific location of the filtered event and the corresponding camera collects the image data at the specific location before the filtered event expires.

2. The event scheduling system of claim 1, wherein the one or more events include a traffic incident involving one or more vehicles.

3. The event scheduling system of claim 1, wherein the one or more events indicate the presence of an object.

4. The event scheduling system of claim 3, wherein the object is one of the following: a pothole on a roadway, a traffic sign, a street sign, a road marking, a building, a landmark, a bicyclist, and a pedestrian.

5. The event scheduling system of claim 1, wherein the one or more notifications are generated by another autonomous vehicle or by an individual.

6. The event scheduling system of claim 1, wherein the unique travel schedule is determined based on either a dynamic programming scheduling approach or a greedy algorithm approach.

7. The event scheduling system of claim 1, wherein the specific autonomous vehicle includes an event observing capacity indicating a number of events the specific autonomous vehicle observes and collects image data for simultaneously.

8. The event scheduling system of claim 7, wherein the one or more processors of the centralized scheduling system further executes instructions to:

execute a dynamic programming scheduling algorithm for a predetermined number of rounds to determine the unique travel schedule, wherein the predetermined number of rounds is equal to the event observing capacity of the specific autonomous vehicle.

9. The event scheduling system of claim 7, wherein the one or more processors of the centralized scheduling system further executes instructions to:
execute a greedy algorithm that introduces the one or more filtered events sequentially to the unique travel schedule of the specific autonomous vehicle until the event observing capacity of the specific autonomous vehicle is reached.

10. The event scheduling system of claim 7, wherein the one or more processors of the centralized scheduling system further executes instructions to:
execute a greedy algorithm that introduces the one or more filtered events to the unique travel schedule of the specific autonomous vehicle based on a total number of events occurring at each event location until the event observing capacity of the specific autonomous vehicle is reached.

11. The event scheduling system of claim 7, wherein the one or more processors of the centralized scheduling system further executes instructions to:
execute a greedy algorithm that introduces the one or more filtered events to the unique travel schedule of the specific autonomous vehicle based on a minimum number of observers required by each event in the event pool until the event observing capacity of the specific autonomous vehicle is reached.

12. The event scheduling system of claim 11, wherein the minimum number of observers represent a minimum number of vehicles required to collect the image data for each event in the event pool.

13. The event scheduling system of claim 1, wherein the one or more processors of the centralized scheduling system further executes instructions to:
determine a maximum capacity percentage for each of the one or more autonomous vehicles based on a machine learning algorithm, wherein the maximum capacity percentage indicates availability for executing an unexpected task that is not included as part of the unique travel schedule.

14. The event scheduling system of claim 13, wherein the one or more processors of the centralized scheduling system further executes instructions to:
calculate a cost function of the machine learning algorithm; and
solve for an output value that is part of the cost function, wherein the output value indicates the maximum capacity percentage for the specific autonomous vehicle.

15. A method for determining a unique travel schedule for a specific autonomous vehicle, the method comprising:
receiving, by one or more processors of a centralized scheduling system, one or more notifications indicating an event has occurred, wherein the centralized scheduling system is in wireless communication with one or more autonomous vehicles including the specific autonomous vehicle and each autonomous vehicle collects image data related to one or more events including the event;
creating, by the one or more processors of the centralized scheduling system, an event pool that stores the one or more events;
comparing a predetermined route corresponding to the specific autonomous vehicle with a specific location corresponding to each event stored in the event pool to identify one or more filtered events, wherein the specific autonomous vehicle travels to the specific location corresponding to a filtered event when following the predetermined route;
determining the specific autonomous vehicle is present when the filtered event occurs based on the predetermined route and the specific location of the filtered event;
identifying a matched pair that includes the filtered event and the predetermined route for the specific autonomous vehicle; and
determining the unique travel schedule for the specific autonomous vehicle based on the matched pair, wherein the unique travel schedule directs the specific autonomous vehicle to the specific location of the filtered event to collect the image data related to the filtered event and wherein the specific autonomous vehicle follows the unique travel schedule by autonomously traveling to the specific location of the filtered event and a corresponding camera collects the image data at the specific location before the filtered event expires.

16. The method of claim 15, further comprising:
executing a dynamic programming scheduling algorithm for a predetermined number of rounds to determine the unique travel schedule, wherein the predetermined number of rounds is equal to an event observing capacity of the specific autonomous vehicle.

17. The method of claim 15, further comprising:
executing a greedy algorithm that introduces the one or more filtered events sequentially to the unique travel schedule of the specific autonomous vehicle until an event observing capacity of the specific autonomous vehicle is reached.

18. The method of claim 15, further comprising:
executing a greedy algorithm that introduces the one or more filtered events to the unique travel schedule of the specific autonomous vehicle based on a total number of events occurring at each event location until an event observing capacity of the specific autonomous vehicle is reached.

19. The method of claim 15, further comprising:
executing a greedy algorithm that introduces the one or more filtered events to the unique travel schedule of the specific autonomous vehicle based on a minimum number of observers required by each event in the event pool until an event observing capacity of the specific autonomous vehicle is reached.

20. The method of claim 15, further comprising:
determining a maximum capacity percentage for each of the one or more autonomous vehicles based on a machine learning algorithm, wherein the maximum capacity percentage indicates availability for executing an unexpected task that is not included as part of the unique travel schedule.

* * * * *